July 18, 1933.   O. MÜLLER   1,918,482
MECHANISM FOR AUTOMATICALLY SELECTING AND SEVERING THE
TERMINAL THREADS OF A STITCHED BOOK OR THE LIKE
Filed Oct. 14, 1931   5 Sheets-Sheet 1

Inventor:
Oskar Müller
By Emil Bönnelyche
Attorney

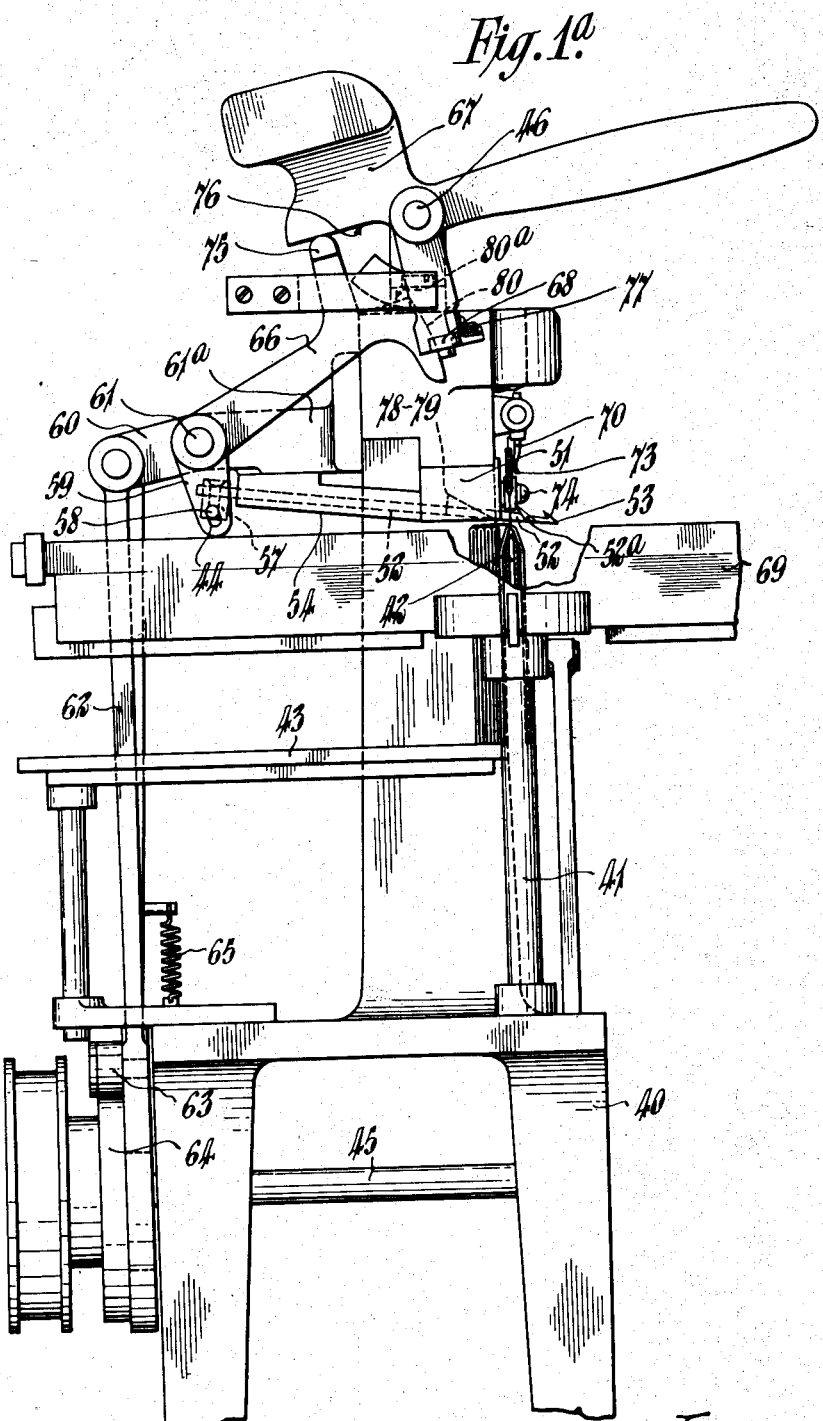

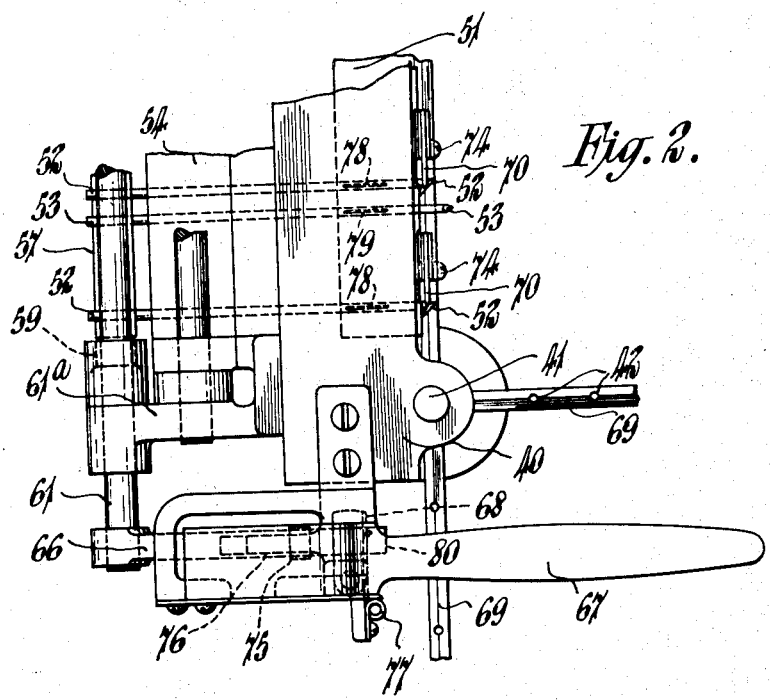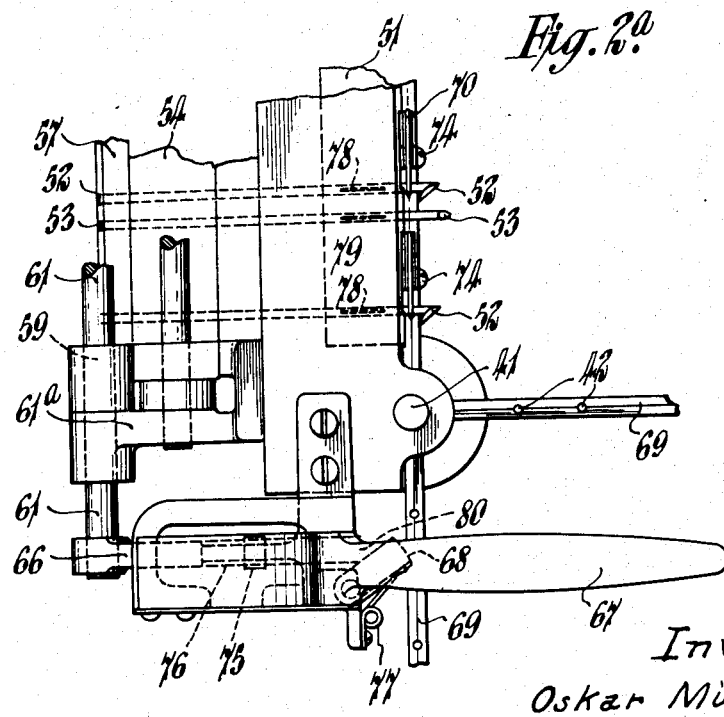

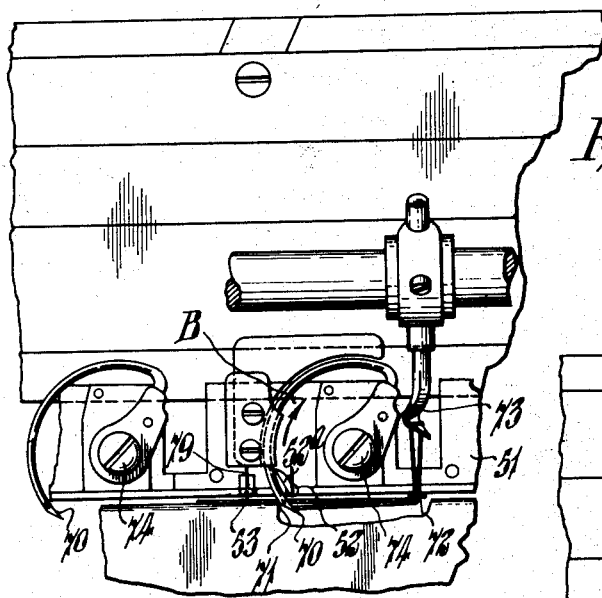
Fig.3.
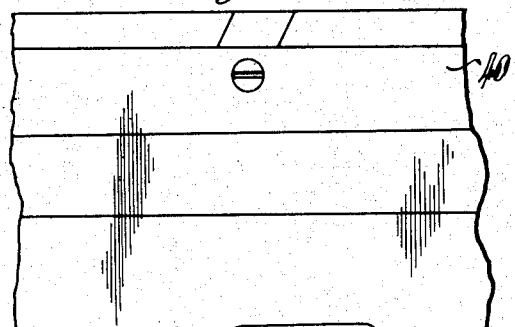
Fig.7.
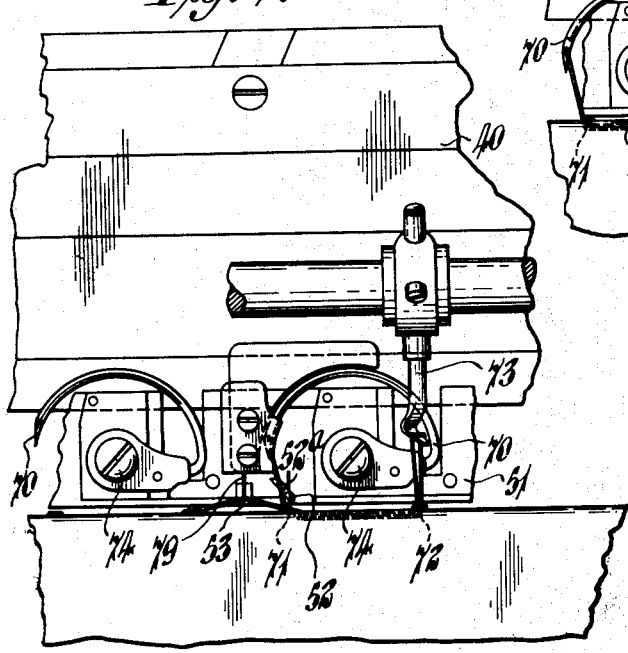
Fig.4.
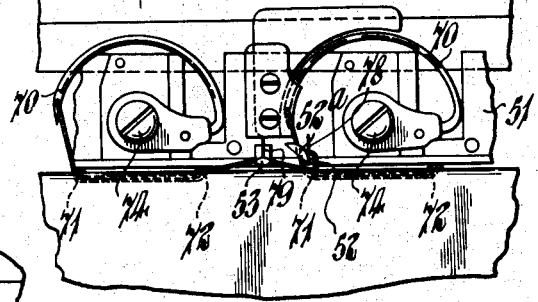
Inventor:
Oskar Müller
By Emil Börnelycke
Attorney July 18, 1933.    O. MÜLLER    1,918,482
MECHANISM FOR AUTOMATICALLY SELECTING AND SEVERING THE
TERMINAL THREADS OF A STITCHED BOOK OR THE LIKE
Filed Oct. 14, 1931    5 Sheets-Sheet 5
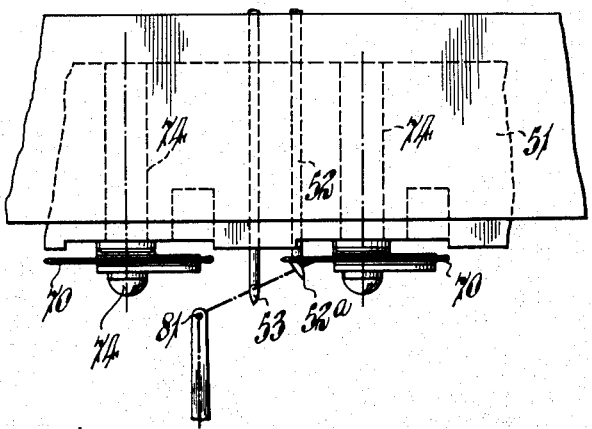
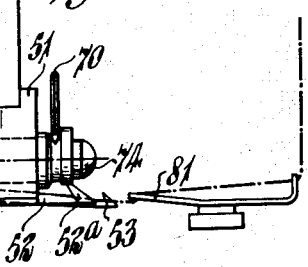
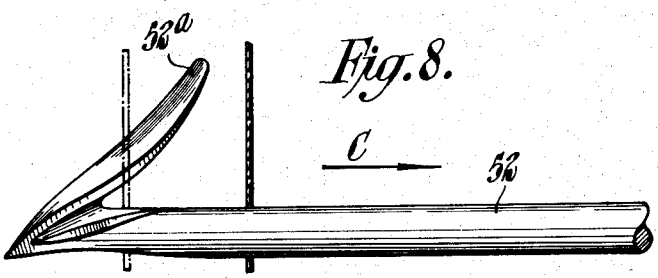
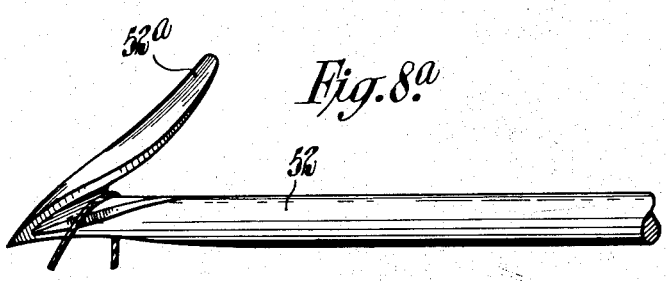
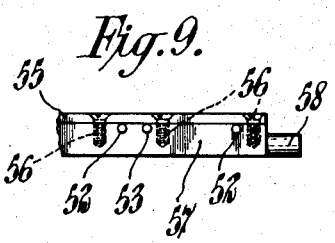
Inventor:
Oskar Müller
By Emil Bönnelycke
Attorney Patented July 18, 1933

1,918,482

UNITED STATES PATENT OFFICE

OSKAR MÜLLER, OF LEIPZIG-PLAGWITZ, GERMANY, ASSIGNOR TO GEBRUDER BREHMER, OF LEIPZIG-PLAGWITZ, GERMANY, A LIMITED PARTNERSHIP OF GERMANY

MECHANISM FOR AUTOMATICALLY SELECTING AND SEVERING THE TERMINAL THREADS OF A STITCHED BOOK OR THE LIKE

Application filed October 14, 1931, Serial No. 568,854, and in Germany April 17, 1931.

The present invention relates to book-stitching machines and has for its object to provide improved mechanism for automatically selecting and severing the interconnecting threads between the completely stitched books of a continuously stitched book-pad such as is produced in certain known types of book-stitching and binding machines.

Although the thread severing mechanism according to this invention is applicable to thread stitching machines of any known type it is more specifically described hereinafter for use in a book-stitching machine of the type employing curved rotating thread-stitching needles which are associated with sheet-carriers of the well-known rotary, rise and fall type.

The main feature of the invention is the provision of a thread selecting and guiding member which is so shaped that upon movement when in engagement with the thread to be severed, the said thread is caused to wind around the shaft of the said guiding member and is thus selected and subsequently guided to a suitable thread severing device.

Such thread selecting members may be used alone to engage and guide the terminal threads of books stitched with simple chain-loop stitches by means of curved rotating thread-stitching needles, or alternatively they may be associated with thread selectors having hook-ends in order to select and guide the connecting threads between the adjacent books of a stitched book-pad to which backing material may be attached by means of cross or staggered stitches.

A constructional embodiment of this invention will now be described in reference to the accompanying drawings in which:

Fig. 1a is a view corresponding to Fig. 1 but showing the position of the thread guiding members and their associated locking mechanism during the first part of their reciprocatory operative movement.

Fig. 2 is a plan view of the mechanism shown in Fig. 1.

Fig. 2a is a plan view corresponding to Fig. 2 but showing the position of the automatic locking mechanism when the thread guiding members are completing the reciprocatory operative movement.

Fig. 3 is a view looking in the direction of the arrow A (Fig. 1), showing details of the thread-stitching mechanism and the thread-selector or guide when the latter member is moved forward to engage the thread to be severed.

Fig. 4 is a view corresponding to Fig. 3, and showing the thread-selector engaging the thread to be severed and about to perform its return movement.

Fig. 5 is a side view of the details of the mechanism shown in Fig. 4.

Fig. 6 is a corresponding plan view of the mechanism shown in Fig. 4.

Fig. 7 is a view corresponding to Figs. 3 and 4, showing the thread previously engaged by the projection at the free extremity of the thread-guiding member and now looped around the shaft of the thread-guiding member.

Fig. 8 shows, drawn to a larger scale, the thread-selecting or guiding member provided with an auxiliary thread-guiding projection adapted to engage the terminal thread leading from a rotary sewing needle to the last formed stitch.

Fig. 8a is a similar view of the thread-selecting or guiding member showing the terminal thread automatically looped around the shaft thereof, and Fig. 9 is a detail view of means for mounting the thread-selector or guiding members upon their carrier.

Figure 1:
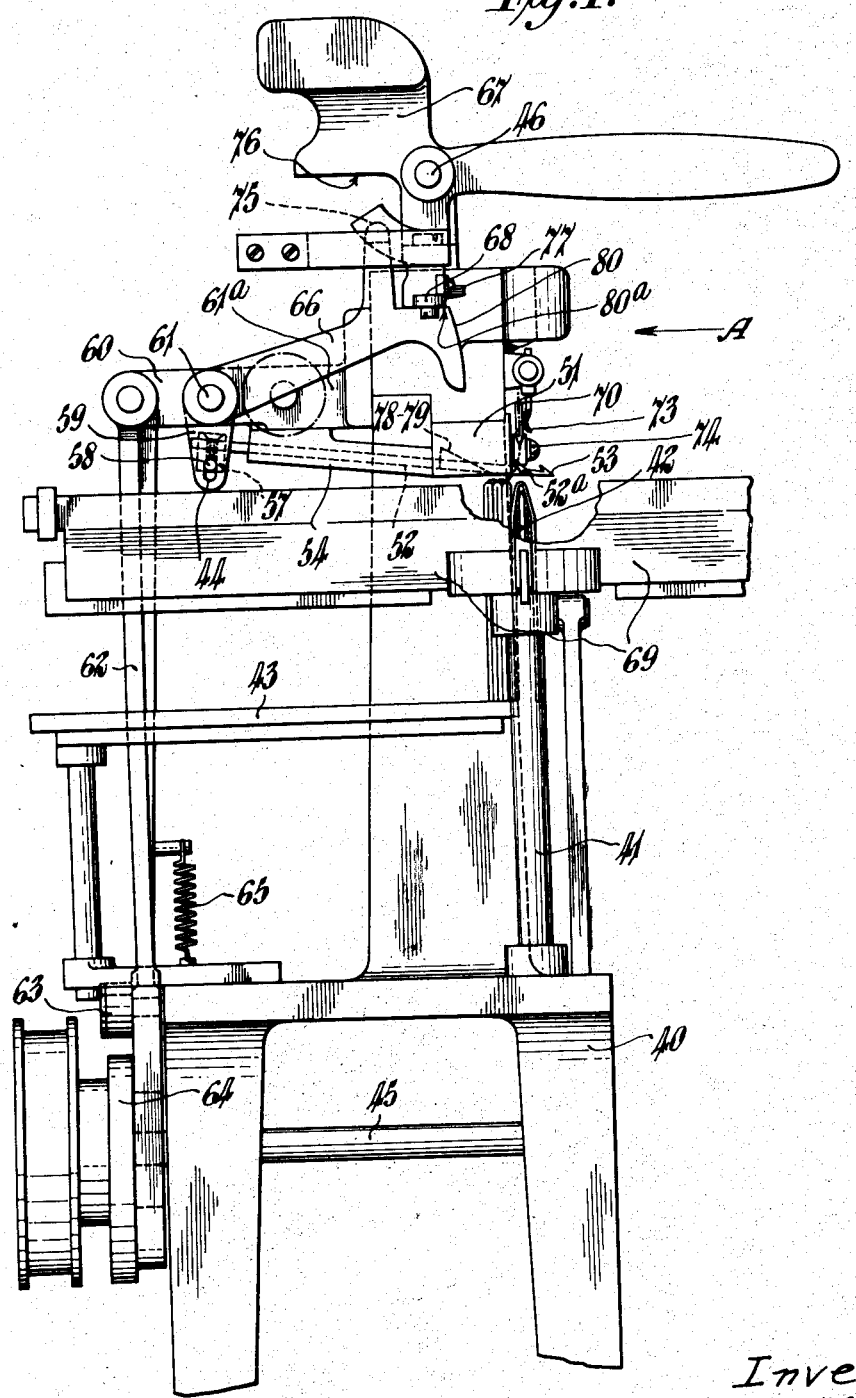
Fig. 1 is a view of part of a book-stitching machine of the rotary rise and fall sheet-carrier type incorporating curved, rotating thread-stitching needles and provided with thread selecting and severing mechanism according to this invention shown in the locked inoperative position.

Referring more particularly to Figs. 1 and 2, the book-binding machine comprises a a frame 40 in which is mounted, on a vertical shaft 41, rotary rise and fall sheet-carriers 69. Associated with the sheet-carriers 69 are rotary curved thread-stitching needles 70 adapted to rotate about suitable pivots 74, and upwardly moving sheet-piercing needles 100

42. Thread-looping members 73 are associated with the stitching needles 70 and the machine may also incorporate an auxiliary thread-stitching needle 81 (Figs. 5 and 6) which is utilized when it is desired to provide a stitched book with staggered or cross stitches. The action of and actuating mechanism for the sheet-carriers and thread stitching needles is well-known and since it forms no part of the present invention it will not herein be described.

A needle guide 51, (Figs. 1 and 2) mounted in the machine frame and associated with the rotary stitching needles 70 and piercing needles 42, is formed with transverse grooves in its underside into which enter obliquely set movable thread selectors or guiding members 52, 53.

The latter are each mounted at one extremity upon a horizontal carrier bar 57 to which they are removably attached by means of the cover plate 55 and screws 56 (Fig. 9), and pass through a slotted guide block 54 attached to or forming part of the needle guide 51. These thread-guiding members 52, 53 are positioned so that the free extremities thereof are associated with the stitching needles and extend across and slightly beyond the book positioned for stitching by the said needles.

The shaft of the guiding member 52 is positioned closely adjacent to the thread leading upwardly from the last stitched book-section to the rotary sewing needle 70 and its free extremity is provided with an auxiliary thread guiding projection 52a. The latter preferably is shaped as a helically curved wing, the helix extending from one lateral edge of the member 52 to the opposite lateral edge thereof as shown more clearly in Fig. 8. Referring to the last mentioned figure of the drawings, it will be seen that if an upwardly extending thread is closely adjacent to one lateral edge of the guiding member 52 and engaged by the auxiliary thread guiding projection as shown, upon the thread guiding member being moved in the direction of the arrow C, the thread, guided by the auxiliary thread guiding projection 52a will pass around the free extremity of the member 52 and subsequently will pass along the shaft of the latter member as shown in Fig. 8a.

The thread guiding member 53 is provided at its free extremity with a hooked portion which is positioned intermediate the path of travel of the staggered or cross thread carried by the thread-stitching needle 81 from one to the other of the adjacent thread sewing needles 70 (Figs. 5 and 6).

Thread severing blades 78, 79 are mounted vertically on each thread severing member 52, 53 respectively or alternatively a suitable thread severing device is associated with each thread guiding member.

The carrier bar 57, arranged transversely to the direction of travel of a stitched book or book-pad moving in the book-trough 43, is provided at its extremities with projections 58 which preferably are of circular section and pivotally engage in slotted apertures 44 formed in crank-arms or levers 59. The latter are rigidly mounted on the horizontal shaft 61 and a lever 60 is also rigidly secured to the said shaft 61. The latter member is journalled in a bearing bracket 61a supported on the machine frame and is thus adapted, when rotated, to rock the crank-arms 59 whereby the thread guiding members 52, 53 attached to the bar 57 are reciprocated.

Rocking movement is imparted to the shaft 61 and crank-arms 59 through the lever 60. one end of which is linked to a vertical connecting rod 62 carrying at its lower end a cam follower or roller 63 engaged by an eccentric or cam 64 which is mounted on a drive shaft 45 the latter being positively driven in any convenient manner from the main drive of the machine. A spiral spring 65 secured to the connecting rod 62 and machine frame 40, holds the cam follower 63 in engagement with the driving cam 64 unless prevented from doing so.

Locking means for withholding the cam follower 63 from engagement with the cam 64 are provided in this machine and are arranged as follows:

A lever 66 rigidly secured at one end to the shaft 61 is provided at its free end with an upwardly projecting finger 75 and a curved nose piece 80. A tripping lever 67 is pivotally mounted at 46 immediately above the path of travel of the free end of the lever 66 and is provided with an abutment 76 adapted, when rocked about the pivot 46, to engage and depress the finger 75 and lever 66. The lever 67 also is provided with a resilient projection comprising a pivotally mounted lug or finger 68 engaged by a spring 77 which normally holds the said lug against a shoulder formed on the lever 67.

The lug or finger 68 is so arranged that the curved nose portion 80 of the lever 66 during its movement engages one edge of the said lug and so deflects it from the path of the lever 66 which moves to its inoperative position whereupon the lug 68, urged by the spring 77, moves back to its locking position and engages the shoulder 80a of the said lever 66, thereby holding the latter in the locked inoperative position.

The above described device operates in the following manner:

The individual sheet-sections to be assembled in the form of a stitched book are placed individually upon a sheet-carrier 69 and so positioned beneath the stitching needles 70. The usual upwardly moving piercing needles 42 pierce the book-section from below and the rotary sewing needle 70, which rotates about its pivot 74 in a plane parallel to the sides of the sheet carrier, carries the thread held thereby through the pierced hole 71 and out again through the hole 72 where it is caught and looped in known manner by the looping member 73 (Fig. 3).

Each book-section is thus stitched and added to the book-pad, the addition serving each time to progress the book-pad along the book trough to the extent of the thickness of the book-section. During these book-stitching operations the thread-selecting or guiding members 52, 53 remain immovable since they are in the normal locked position shown in Fig. 1.

When the final section of a complete book is stitched or alternatively when an idle stitch is formed after the final book-section of each book is stitched, the operator pushes the lever 67 upwards, the commencement of this movement being shown in Fig. 1a. The upward movement of the lever 67 displaces the pivotal lug 68 from its locking or holding position on the shoulder 80a of the lever 66 and the latter is released and permitted to move upwards. In consequence of the release of the lever 66, the spring 65 is enabled to pull the cam follower 63 down into contact with the constantly driven cam 64 whereupon the free extremities of the thread guiding members are moved forward beyond the thread stitching needles and then reciprocated in accordance with the throw of the cam 64.

The thread guiding members 52, 53 are timed to advance as the sewing needle 70 withdraws the thread or is about to withdraw it from the last stitch forming operation in the direction of the arrow B (Fig. 3). The thread guiding member 52 advances with its auxiliary thread-guiding projection very close to the sewing needle 70 and adjacent the needle eye now withdrawing with the thread from the last formed stitch. The thread, at this juncture cannot be contacted with or touched by the projection 52a since the thread runs, in known manner in a groove around the outer curved face of the sewing needle 70. The curved needle continues to rotate and thus carries the thread upwards. The thread, which constitutes the terminal or connecting thread of the stitched book assumes a straight line from the shaft of the member 52 to the needle 70 as the latter continues to lift, and thus comes to lie behind the thread guiding projection 52a as shown in Fig. 4.

When the updrawn thread is so positioned, the guiding member 52 is retracted in the completion of its reciprocatory movement. In so retracting, the auxiliary thread guiding projection 52a engages the updrawn thread and, as above explained, causes the said thread to loop round the shaft of the member 52 and so wind around the said shaft when the sewing needle 70 inserts the first stitch into the foremost section of the following book (Fig. 7).

During the continued stitching of the books, the book-pad is progressed along the book-pad trough 43 and so carries the looped terminal thread along the shaft of the thread-guiding member 52 until the said thread encounters the cutting edge of the thread-severing member 78 by which it is severed.

If the book-pad is provided with a backing strip stitched thereto, the needle 81 is utilized in known manner to pass a thread in cross or staggered fashion across the back of the book-pad and leading from one to the other of the sewing needles 70. Such of these cross threads which extend between the last section of one book and the first section of the adjacent book must be severed to complete the separation of the book and the guiding member 53 is adapted to perform this operation.

The member 81 is caused to feed the thread across the book back and immediately above it and the hooked extremity of the thread guiding member 53, in the locked or normal position shown in Fig. 1, is positioned so that the thread passes below it and is not engaged. As above stated, however, when the last book section of each book is to be stitched or alternatively an idle stitch is to be formed after the stitching of the last book-section, the guiding member 53 together with the guiding member 52 is caused to move forward.

By reason of the oblique position of the members 52 and 53, the latter, when moved forward as above described moves into the plane of the cross thread as the latter is fed from the member 81 during the lateral movement of this member. When the hooked extremity of the member 53 is moved into the plane of the cross thread the latter is passed across and rests upon the shaft of the said member 53. In the course of the reciprocatory movement of the latter thread guiding member, the hooked extremity thereof engages and draws therewith to a slight extent, the cross thread which during the continued stitching and advance of the book-pad is pushed along the shaft of the thread guiding member towards the thread-severing member 79 and severed thereon.

During the advance of the guiding members 52, 53 when released from the locking device by the elevation of the lever 67, the lever 66 rigidly mounted on the rockable shaft 61 is raised as shown in Fig. 1a and the finger 75 engages the projection 76 of the lever 67 and so returns the latter to its normal inoperative position shown in Fig. 1.

As the reciprocatory movement of the thread guiding members 52, 53, now engaging their respective terminal threads, is completed by the cam actuated linkage, the shaft 61 is rocked in the opposite direction and the lever 66 descends. In its descent, the nose-piece 80 thereof engages the edge of the projection or lug 68 and pushes the latter out of its path as shown in Fig. 2a. The lever 66 is then carried to its normal stationary position clear of the lug 68 and the latter urged by the spring 77 recovers its normal position above the shoulder 80a of the lever 66, so locking the latter against movement and withholding, against the force of the spring 65, the cam follower 63 from engagement with the cam 64.

The thread guiding mechanism is thus automatically locked after each individual operative movement and cannot again move to its operative position until the lever 67 is actuated.

It will be understood that, when in the locked position shown in Fig. 1, the thread selecting or guiding member 52 does not engage the updrawn terminal thread which passes to one side thereof.

The said thread is only engaged when the thread severing mechanism is released to movement and is retracted so that the thread-guiding projection 52a engages the thread as above described.

Likewise the thread guiding member 53 is adjacent to but clear of the path of the cross or staggered thread fed by the laterally displaceable member 81 until similarly released to movement whereupon the forward movement first imparted to the said member 53 places the hooked, free extremity thereof into the path of the cross thread to be severed.

Thus the thread guiding members 52, 53 also constitute thread-selecting members since only one of a series of threads leading from the book sections to the sewing needles, i. e. the terminal thread of each completely stitched book, is engaged by the thread guiding members.

In the above description thread severing apparatus for severing one row of chain-loop and cross or staggered stitches has been more specifically described, but it will be appreciated that the number of thread guiding members 52, 53 mounted on the carrier bar 57 will correspond to the number of stitcher heads operating in the machine to insert, if required, a plurality of stitches across the width of each book back.

I claim:—

1. In a book-stitching machine, mechanism for severing the terminal threads of a stitched book or the like, comprising a thread-guiding member provided with a projection shaped to form a helical path leading from one side of the said thread-guiding member to the opposite side thereof, means for engaging said projection with a terminal thread to be severed so that the said thread is looped over the said thread-guiding member, and a thread severing device associated with the said thread-guiding member.

2. In a book stitching machine, mechanism for severing the terminal threads of a stitched book or the like, comprising a thread-guiding member provided with an auxiliary thread-guiding projection, a second thread-guiding member having a hook at one extremity thereof, means for engaging the first thread-guiding member with the terminal thread to be severed, means for engaging the second thread-guiding member with an associated terminal thread to be severed, a thread severing device associated with the first thread-guiding member, and a thread severing device associated with the second thread-guiding member.

3. In a book-stitching machine, mechanism for severing the terminal threads of a stitched book or the like, comprising a thread-guiding member provided with an auxiliary thread-guiding projection and adapted to move obliquely to the stitched book, a second thread-guiding member having a hooked extremity and adapted to move obliquely to the stitched book, means for engaging the first thread-guiding member with the terminal thread to be severed, means for engaging the second thread-guiding member with an associated terminal thread to be severed, a thread-severing device associated with the first thread-guiding member, and a thread-severing device associated with the second thread-guiding member.

4. In a book-stitching machine, thread severing mechanism comprising, in combination, a rotatable shaft, crank-arms rigidly mounted on said shaft, a transverse carrier bar pivotally held by said crank-arms, at least one thread-guiding member mounted on said carrier bar, a thread severing device associated with the said thread-guiding member, a rocking lever rigidly mounted on said shaft, a timed cam drive, a connecting rod linked to said rocking lever, and a cam follower mounted on said connecting rod and resiliently held in engagement with said cam drive.

5. In a book-stitching machine, thread severing mechanism comprising, in combination, a rotatable shaft, crank-arms rigidly mounted on said rotatable shaft, a transverse carrier bar pivotally held by said crank arms, at least one thread guiding member mounted on said carrier bar, means for oscillating said carrier bar to reciprocate said thread guiding member, a thread severing device associated with said thread guiding member, means for locking said carrier bar and thread guiding member against movement, and means for releasing said locking means as set forth.

6. In a book-stitching machine, thread-severing mechanism comprising, in combination, a rotatable shaft, crank-arms rigidly mounted on said shaft, a transverse carrier bar pivotally held by said crank-arms, thread guiding members mounted on said carrier bar, means for oscillating said carrier bar to reciprocate said thread-guiding members, a locking lever rigidly mounted on said rotatable shaft, a tripping lever rotatably mounted adjacent said locking lever, a resilient lug or stop mounted on said tripping lever and adapted to engage and retain in an inoperative position the said locking lever, and a thread severing device associated with each thread-guiding member.

7. In a book-stitching machine, thread severing mechanism comprising, in combination, a rotatable shaft, crank-arms rigidly mounted on said rotatable shaft, a transverse carrier bar pivotally held by said crank arms, thread-guiding members mounted on said carrier bar, means for oscillating said crank arms to reciprocate said thread guiding members, a locking lever rigidly mounted on said rotatable shaft, a resilient lug or stop displaceably mounted adjacent said locking lever and adapted to engage the latter member, means for displacing the said lug or stop from engagement with the said locking lever, means for restoring the said lug or stop to its operative position, and a thread severing device associated with each thread-guiding member.

8. In a book-stitching machine, thread severing mechanism comprising, in combination, a rotatable shaft, spaced crank arms rigidly mounted on said rotatable shaft, a transverse carrier bar extending between and pivotally held by said crank arms, thread-guiding members mounted on said carrier bar, a thread severing device associated with each thread-guiding member, means for oscillating said crank arms and said carrier bar to reciprocate said thread-guiding members, a locking lever rigidly mounted on said rotatable shaft and provided with an extending finger, a tripping lever pivotally mounted adjacent said locking lever and provided with an abutment adapted to be engaged by the finger extending from the said locking lever, a resilient stop mounted on said tripping lever and adapted to hold in an inoperative position the said locking lever, means for displacing said lug or stop from its operative position, and means for restoring said lug or stop to its operative position.

9. In a book-stitching machine, in combination, a rotatable shaft, crank arms rigidly mounted on said rotatable shaft, a transverse carrier bar extending between and pivotally held by said crank arms, thread-guiding members mounted on said carrier bar, thread-severing members associated with said thread-guiding members, means for oscillating said crank-arms and said carrier bar to reciprocate said thread-guiding members, a locking lever rigidly mounted on said rotatable shaft and provided with an extending finger and a curved nose-piece, a tripping lever pivotally mounted above said locking lever and provided with an abutment, a resilient lug or stop mounted on said tripping lever and adapted to be momentarily deflected from its operative position by engagement with the curved nose-piece of the said locking lever, means for displacing from its operative locking position the said lug or stop, means for engaging the extending finger of said locking lever with the abutment of said tripping lever to restore said lug or stop to its operative position, and means for automatically engaging said locking lever with said locking lug.

10. In a book-stitching machine, in combination, a machine frame, rotary rise and fall sheet carriers, a book trough associated with said sheet carriers, curved rotary thread stitching needles positioned above said book trough, bearing brackets attached to said machine frame, a horizontal shaft journalled in said bearing brackets, downwardly extending crank-arms rigidly mounted on said shaft, a transverse carrier bar rotatably mounted in said crank-arms, at least one thread-guiding member attached at one extremity to the said carrier bar and provided with an auxiliary thread-guiding member positioned adjacent one of the said rotary thread-stitching needles, a thread-severing member associated with said thread-guiding member, a rocking lever rigidly mounted on said shaft, a connecting rod linked to said rocking lever, a cam follower mounted on said connecting rod, a cam adapted to engage and lift said cam follower whereby movement is imparted to the said rotatable shaft to reciprocate the said thread-guiding members, and means for resiliently holding the said cam follower in contact with the said cam.

11. In a book-stitching machine, in combination, a machine frame, rotary rise and fall sheet carriers, a book trough associated with said sheet carriers, curved rotary thread-stitching needles positioned above said trough, a laterally displaceable thread-positioning needle associated with said curved rotary needles, bearing brackets attached to said machine frame, a horizontal shaft journalled in said brackets, crank arms rigidly mounted on said horizontal shaft, a transverse carrier bar pivotally held by said crank arms, at least one thread guiding member mounted on said carrier bar and provided with an auxiliary thread guiding projection extending beneath said rotary needles, at least one thread guiding member mounted on said carrier bar and provided with a hooked extremity extending beneath the rotary needles, a thread severing member associated with the first mentioned thread-guiding member, a thread severing member associated with the second mentioned thread guiding member, a rocking arm rigidly mounted on said shaft, timed actuating mechanism connected to said rocking arm to rock the said crank-arms and thereby reciprocate the said thread-guiding members, means for locking the said rocking arm and thread-guiding members against movement, means for releasing the locked mechanism from the said locking means, and means for automatically engaging the said thread-severing mechanism with the said locking mechanism.

12. In a book-stitching machine, in combination, a machine frame, rotary rise and fall sheet carriers, a book trough associated with said sheet carriers, curved rotary thread stitching needles positioned above said book trough, a needle guide associated with said stitching needles and having its underside formed with oblique grooves therein, a grooved guide block associated with said needle guide, a bearing bracket attached to said machine frame, a shaft journalled in said bearing bracket, crank-arms rigidly mounted on said shaft, a transverse carrier bar pivotally held by said crank-arms, thread-guiding members mounted at one extremity upon said carrier bar and passing through the grooves in said guide block and said needle guide to extend beneath the said stitching needles, means for rocking said shaft and said crank-arms and carrier bar to reciprocate said thread-guiding members, means for automatically locking against movement the said thread-guiding members, means for deflecting said locking means to release said thread-guiding members, and means for restoring said locking means to the operative position.

13. In a book-stitching machine, in combination, a machine frame, rise and fall sheet-carriers mounted in said machine frame, thread-guiding members, thread-severing members associated with said thread-guiding members, means provided on at least one of said thread-guiding members for guiding said thread from one longitudinal side to the opposite longitudinal side of said thread-guiding member, means for positioning the thread-engaging extremities of said thread guides adjacent the stitching needles, means for reciprocating said thread guiding members, means for timing the reciprocation of said thread guiding members, means for locking the said thread-guiding members against movement, means for displacing said locking means from the operative position, means for restoring said locking means to the operative position and means for engaging automatically the said locking means and said thread severing device.

14. In a book-stitching machine, mechanism for severing the terminal threads of a stitched book or the like, comprising a thread-guiding member provided with a projection shaped to form a thread-guiding path leading from one side of said thread-guiding member to the opposite side thereof, means for engaging said projection with a thread positioned to one side of said thread-guiding member so that said thread becomes looped over said thread-guiding member, and a thread-severing device associated with said thread-guiding member.

15. In a book-stitching machine, mechanism for severing the terminal threads of a stitched book or the like, comprising a thread-guiding member provided with an auxiliary thread-guiding projection, means for engaging said thread-guiding projection with an updrawn thread so that the latter becomes looped over said thread-guiding member, and a thread-severing device associated with said thread-guiding member.

16. In a book-stitching machine, mechanism for severing the terminal threads of a stitched book or the like, comprising a thread-guiding member provided with an auxiliary thread-guiding projection, means for engaging said thread-guiding projection with a thread leading from a formed stitch so that said thread becomes looped over said thread-guiding member in the formation of the subsequent stitch, and a thread-severing device operatively associated with said thread-guiding member.

17. In a book-stitching machine, mechanism for severing the terminal threads of a stitched book or the like, comprising a thread-guiding member provided with an auxiliary thread-guiding projection, means for engaging said projection with a thread so that the latter becomes looped over said thread-guiding member and progresses along it independently of the movement of the thread-guiding member, and a thread-severing device associated with said thread-guiding member.

18. In a book-stitching machine, mechanism for severing the terminal threads of a stitched book or the like, including a thread-guiding device, which comprises a thread-guiding shaft having an auxiliary thread-guiding projection extending from it at an angle to both the vertical and horizontal planes, means for imparting reciprocatory movement to said shaft, and a thread-severing device operatively associated with said shaft.

19. In a book-stitching machine, mechanism for severing the terminal threads of a stitched book or the like, including a thread-guiding device which comprises a thread-guiding shaft, an auxiliary thread-guiding projection extending longitudinally of said shaft from one extremity of it at an angle to both the vertical and horizontal planes to form a tapered nose, means for imparting movement to said shaft, and a thread-severing device operatively associated with said shaft.

20. In a book-stitching machine, mechanism for severing the terminal threads of a stitched book or the like, including a thread-guiding device which comprises a thread-guiding shaft, a curved auxiliary thread-guiding projection extending longitudinally of said shaft at an angle to both the horizontal and vertical planes to form a curved guide path for a thread engaged by said projection, means for imparting reciprocatory movement to said shaft, and a thread-severing device operatively associated with said thread-guiding device.

21. In a book-stitching machine, mechanism for severing the terminal threads of a stitched book or the like, including a thread-guiding device which comprises a thread-guiding shaft, having an auxiliary thread-guiding projection extending from it at an angle to both the vertical and horizontal planes, a thread-severing blade mounted upon said shaft, and means for imparting reciprocatory movement to said shaft.

22. In a book-stitching machine, in combination, a thread-guiding member having an auxiliary thread-guiding projection extending from it, a curved rotary thread-sewing needle adapted to draw a thread to one side of said thread-guiding member, means for imparting movement to said thread-guiding member so that said projection engages said thread to cause the latter to loop over said thread-guiding member, and a thread-severing device adapted to sever the looped thread.

OSKAR MÜLLER.